(12) United States Patent
Lee et al.

(10) Patent No.: US 9,520,159 B2
(45) Date of Patent: Dec. 13, 2016

(54) APPARATUS FOR STORING SOLID STATE DRIVES OR HARD DISK DRIVES

(75) Inventors: Gene Jingluen Lee, Arcadia, CA (US); Cheng-Chu Lee, West Covina, CA (US); Chang-Feng Chu, Taoyuan (TW); I-Chen Chen, Longtan Township (TW)

(73) Assignee: ECHOSTREAMS INNOVATIVE SOLUTIONS, LLC, City of Industry, CA (US)

( * ) Notice: Subject to any disclaimer, the term of this patent is extended or adjusted under 35 U.S.C. 154(b) by 606 days.

(21) Appl. No.: 13/436,397

(22) Filed: Mar. 30, 2012

(65) Prior Publication Data
US 2013/0180935 A1    Jul. 18, 2013

(51) Int. Cl.
*G11B 33/12* (2006.01)
*G06F 1/18* (2006.01)

(52) U.S. Cl.
CPC ............ *G11B 33/128* (2013.01); *G06F 1/187* (2013.01)

(58) Field of Classification Search
CPC .................. G06F 1/187; G11B 33/123–33/128
USPC ..... 361/679.33, 679.34; 211/41.12, 26, 26.2; 312/223.1–223.3
See application file for complete search history.

(56) References Cited

U.S. PATENT DOCUMENTS

| | | | |
|---|---|---|---|
| 5,483,419 A * | 1/1996 | Kaczeus et al. | 361/679.39 |
| 5,923,501 A | 7/1999 | Suzuki et al. | |
| 6,683,785 B1 * | 1/2004 | Chen | 361/679.33 |
| 6,798,650 B2 * | 9/2004 | Reznikov et al. | 361/679.33 |
| 7,012,815 B2 | 3/2006 | Garnett et al. | |
| 7,016,190 B1 * | 3/2006 | Chang | 361/679.33 |
| 7,054,160 B2 * | 5/2006 | Kim | 361/754 |
| 7,400,936 B2 * | 7/2008 | Chang | 700/90 |
| 7,639,490 B2 * | 12/2009 | Qin et al. | 361/679.34 |
| 7,903,401 B2 * | 3/2011 | Lee et al. | 361/679.33 |
| 8,004,830 B2 * | 8/2011 | Lu | 361/679.33 |
| 2002/0044419 A1 | 4/2002 | Salinas et al. | |
| 2009/0279248 A1 * | 11/2009 | Baker et al. | 361/679.58 |
| 2011/0005068 A1 * | 1/2011 | Zhang et al. | 29/729 |
| 2011/0019352 A1 | 1/2011 | Kwon et al. | |
| 2011/0073734 A1 | 3/2011 | Chang | |
| 2011/0128696 A1 | 6/2011 | Weng | |
| 2011/0292541 A1 | 12/2011 | Kimura et al. | |
| 2012/0023370 A1 | 1/2012 | Truebenbach | |

OTHER PUBLICATIONS

International Search Report and Written Opinion dated Aug. 27, 2013 for related PCT Application No. PCT/US2013/034716, 16 pages.
Snia, "Solid State Storage Form Factos" Jan. 19, 2012, 3 pages.

* cited by examiner

*Primary Examiner* — Korie H Chan
(74) *Attorney, Agent, or Firm* — Vista IP Law Group, LLP

(57) ABSTRACT

An apparatus includes a container having a base for receiving a drive, and a clam having a first end that is rotatably coupled to the base, a second end, and a body extending from the first end to the second end, the clam rotatable relative to the base so that the clam can be placed at a first position and a second position, wherein when the clam is at the first position, the container allows the drive to be placed therein, and wherein when the clam is at the second position, the clam secures the drive relative to the container. A frame includes at least sixteen slots to receive respective drive storage devices, which store respective SFF8201 7 mm drives, in EIA RS310D 1U space. A frame includes at least forty-eight slots to receive respective drive storage devices, which store respective SFF8201 7 mm drives, in EIA RS310D 2U space.

29 Claims, 7 Drawing Sheets

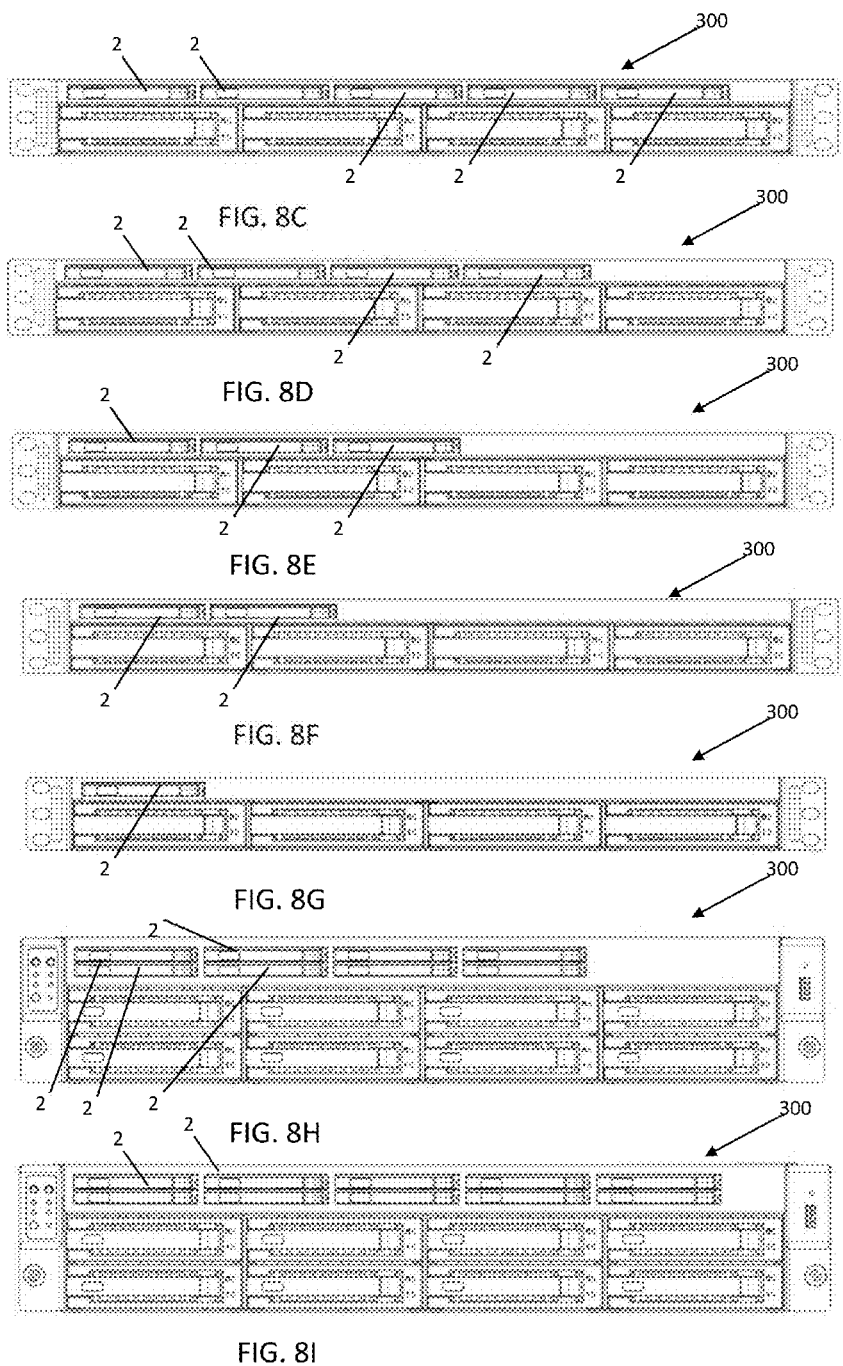

APPARATUS FOR STORING SOLID STATE DRIVES OR HARD DISK DRIVES

RELATED APPLICATION DATA

This application claims priority to and the benefit of Chinese patent application No. 201220025996.8, filed on Jan. 19, 2012, pending, and Taiwanese patent application No. 101201188, filed on Jan. 18, 2012, pending, the entire disclosures of both of which are expressly incorporated by reference herein.

FIELD

This application relates generally to solid state drives and hard disk drives, and more specifically, to apparatuses for storing solid state drives and hard disk drives.

BACKGROUND

An existing server rack may include a plurality of slots for accommodating respective storage drives. When coupling a storing dive to such server rack, the storage drive is first secured to a tray using a plurality of screws, and the tray together with the storage drive is then inserted into a slot at the server rack.

Applicant of the subject application has determined that it would be desirable to provide a tray that does not require use of any screw to detachably secure a storage drive to the tray. Applicant of the subject application has also determined that it would be desirable to provide a frame (e.g., a server rack) that can allow the storage drives to be packed tightly therein.

SUMMARY

In accordance with some embodiments, an apparatus for storing a drive, includes a container having a base for receiving the drive, and a clam having a first end that is rotatably coupled to the base, a second end, and a body extending from the first end to the second end, the clam rotatable relative to the base so that the clam can be placed at a first position and a second position, wherein when the clam is at the first position, the container allows the drive to be placed therein, and wherein when the clam is at the second position, the clam secures the drive relative to the container.

In accordance with other embodiments, a frame includes a plurality of slots configured to receive respective drive storage devices, wherein a center-to-center spacing between two adjacent ones of the plurality of slots is 8.8 mm or less.

In accordance with other embodiments, a frame includes at least sixteen slots configured to receive respective drive storage devices, which store respective SFF8201 7 mm drives, in EIA RS310D 1U space.

In accordance with other embodiments, a frame includes at least forty-eight slots configured to receive respective drive storage devices, which store respective SFF8201 7 mm drives, in EIA RS310D 2U space.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings are not to be considered limiting in the scope of the claims.

FIGS. 8A-8J illustrates different frames for receiving multiple drive storage devices in accordance with different embodiments.

DESCRIPTION OF THE EMBODIMENTS

Figure 1:
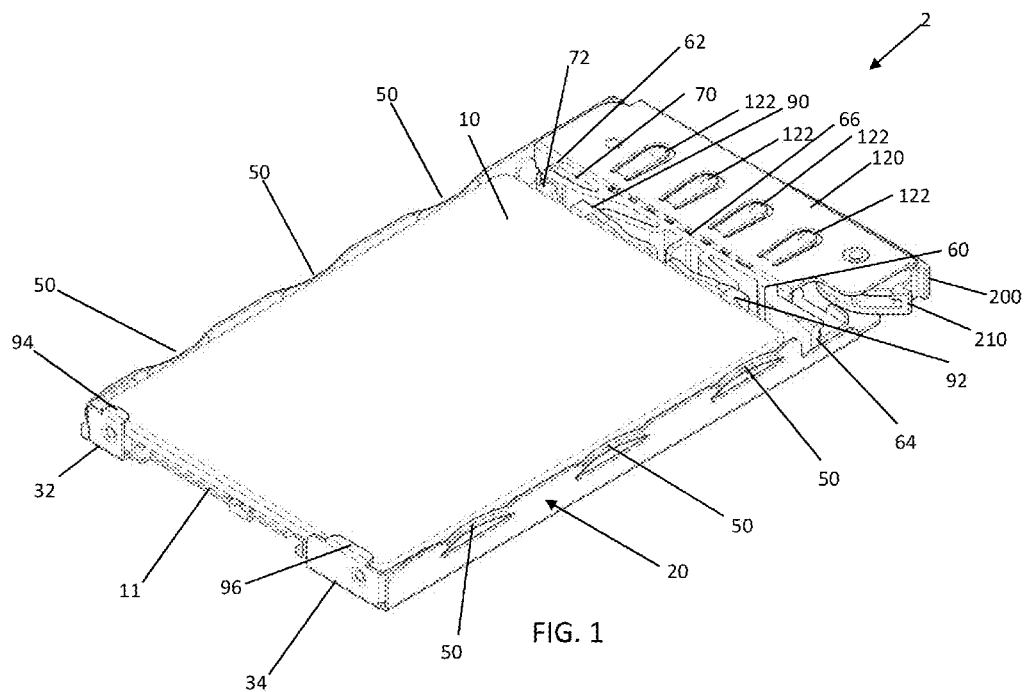
FIG. 1 illustrates an apparatus for storing a drive in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Figure 2:
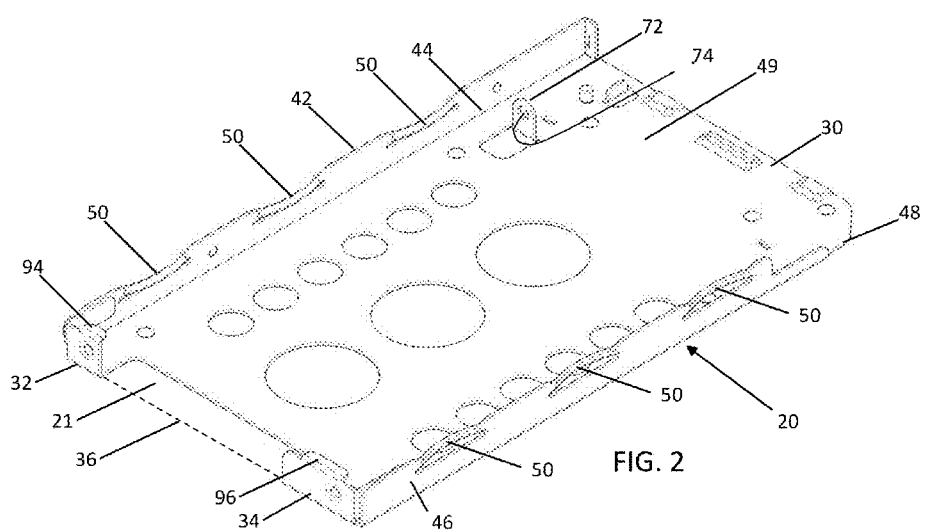
FIG. 2 illustrates a container, which is a component of the apparatus of FIG. 1 in accordance with some embodiments.

FIG. 1 illustrates an apparatus 2 for storing a drive 10 in accordance with some embodiments. The apparatus 2 includes a container 20 configured (e.g., sized and/or shaped) to receive the drive 10. In the illustrated embodiments, the drive 10 is a solid state drive. In other embodiments, the drive 10 may be a hard disk drive. As shown in FIGS. 1 and 2, the container 20 includes a base 30 for receiving the drive 10, two end walls 32, 34 at a short side 36 of the base 30, a first wall 42 at a long side 44 of the base 30, and a second wall 46 at another long side 48 of the base 30. The base 30 also includes an opening 21 for allowing access to contacts 11 of the drive 10 when the drive 10 is installed into the apparatus 2. In some embodiments, the end walls 32, 34 may be considered wall portions of a wall. The base 30 and the walls 32, 34, 42, 46 together at least partially define a space 49 for receiving the drive 10. In other embodiments, the number of end walls (or wall portions) at the short side 36 may be different from two. For example, in other embodiments, the container 20 may include only one end wall, or more than two end walls.

As shown in FIGS. 1 and 2, the first and second walls 42, 46 include respective protrusions 50 for engaging against the sides of the drive 10 when the drive 10 is received in the container 20. In some embodiments, each protrusion 50 may be formed from a part of the wall 42/46 by bending the part of the wall 42/46. In other embodiments, each protrusion 50 may be a component that is separately attached to the wall 42/46. In the illustrated embodiments, each protrusion 50 has a curvilinear shape. In other embodiments, each protrusion 50 may have a non-curvilinear shape. Also, in other embodiments, instead of having multiple protrusions 50 at each of the walls 42, 66, there may be only one protrusion 50 at each of the walls 42, 66. In further embodiments, the number of protrusions 50 at each of the walls 42, 66 may be different from the example shown. Furthermore, in other embodiments, the protrusions 50 may be optional, and the apparatus 2 may not include any protrusions 50 at the walls 42, 66.

In the illustrated embodiments, the apparatus 2 also includes a clam 60 configured (e.g., sized and/or shaped) to detachably secure the drive 10 relative to the container 20. The clam 60 includes a first end 62 that is rotatably coupled to the base 30, a second end 64, and a body 66 extending from the first end 62 to the second end 64. The first end 62 of the clam 60 includes a hinge 70 that rotatably secures the clam 60 to a wall 72. In some embodiments, the hinge 70 may be implemented as a screw. The wall 72 includes an opening 74 for receiving the hinge 70, and may be formed by a portion of the base 30 by bending the portion out of a plane of the base 30. In other embodiments, the wall 72 may be attached to the base 30 using an adhesive or a connection mechanism. The clam 60 may be made from plastic, or other materials, such as metal, alloy, etc.

Figure 3:
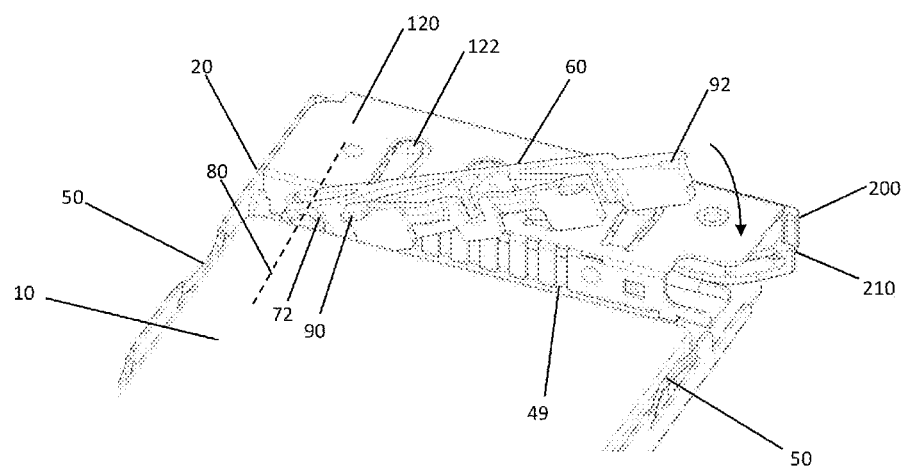
FIG. 3 illustrates a clam, particularly showing the clam in an open configuration.
Figure 4:
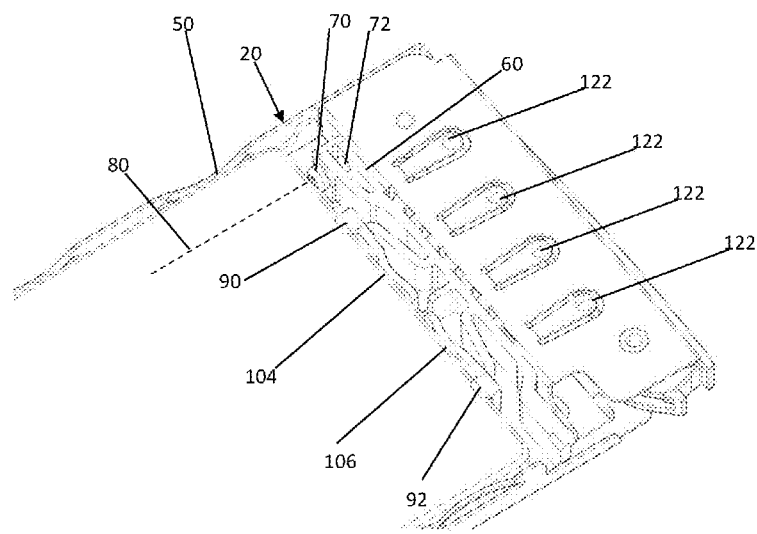
FIG. 4 illustrates the clam of FIG. 3, particularly showing the clam in a closed configuration.

As shown in FIGS. 1, 3, and 4, the clam 60 is rotatable about an axis 80 so that it may be placed at a first position (FIG. 3) in which the container 20 can receive the drive 10, and a second position (FIG. 4) in which the clam 60 detachably secures the drive 10 relative to the container 20. As shown in FIG. 1, when the clam 60 is at the second position, the clam 60 includes two tabs 90, 92 with respective surfaces that are parallel to a plane of the base 30, so that they can engage with a planar surface of the drive 10, thereby preventing the drive 10 from falling off from the container 20. The container 20 also has two tabs 94, 96 at the respective end walls 32, 34 of the container 20, which cooperate with the tabs 90, 92 of the clam 60 to detachably secure the drive 10 relative to the container 20. The two tabs 94, 96 may be respective wall flanges that are extensions from the respective end walls 32, 34. In some embodiments, the wall flanges may be formed by bending the extensions relative to the respective end walls 32, 34 so that the wall flanges have respective surfaces that are parallel to the base 30.

Figure 5:
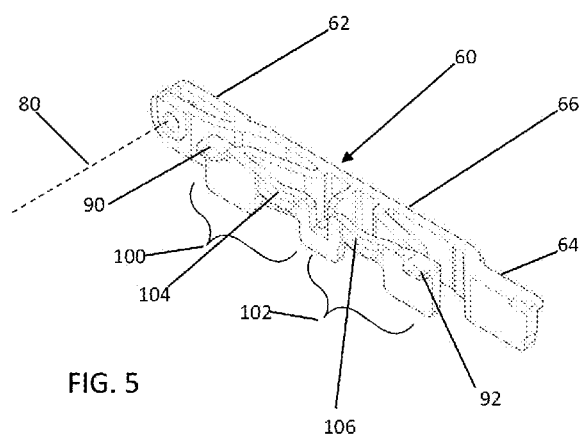
FIG. 5 illustrates the clam of FIG. 3 in accordance with some embodiments.

FIG. 5 illustrates the clam 60 in further details. As shown in the figure, the clam 60 includes two spring components 100, 102. Each of the spring components 100, 102 has a cantilever configuration configured to elastically urge respective portions 104, 106 to engage with a side of the drive 10 when the clam 60 is at the second position to secure the drive 10 relative to the container 20 (FIG. 4). In the illustrated embodiments, each of the portions 104, 106 has a curvilinear configuration. In other embodiments, each of the portions 104, 106 may have a non-curvilinear configuration. Also, in other embodiments, instead of having two spring components 100, 102, the clam 60 may have only one spring component, or more than two spring components. In addition, in other embodiments, instead of the cantilever configuration, each of the spring components 100, 102 may have other configurations. For example, in other embodiments, the elastic feature may be provided using a coil spring. In further embodiments, the curvilinear portions 104, 106 are optional, and may not be required. As shown in FIG. 5, the clam 60 also includes an opening 68 for accommodating the hinge 70.

In the illustrated embodiments, the entire clam 60 including the body 66, the tabs 90, 92, and the spring components 100, 102, is formed from a same material so that it has an unity configuration. In other embodiments, the tabs 90, 92 and/or the spring components 100, 102 may be separately connected to a remaining part of the clam 60 using an adhesive or a connection mechanism.

In the above embodiments, the clam 60 has a longitudinal axis that is parallel to a short side of the base 30, and is configured to rotate about the axis 80 that is parallel to a long side of the base 30. In other embodiments, the clam 60 may be oriented and positioned differently from the example shown. For example, in other embodiments, the clam 60 may have a longitudinal axis that is parallel to a long side of the base 30, in which case, the clam 60 may be configured to rotate about an axis that is parallel to a short side of the base 30.

Also, it should be noted that the clam 60 is not limited to the examples of configurations discussed, and may have different configurations in different embodiments. For example, in other embodiments, the clam 60 may have a different shape from that shown in the embodiments of FIG. 3. Also, in other embodiments, instead of having two tabs 90, 92, the clam 60 may have only one tab, or more than two tabs. In the illustrated embodiments, the tabs 90, 92 are located on the respective spring components 100, 102. In other embodiments, the tabs 90, 92 may be located at other parts of the clam 60.

Returning to FIG. 1, the apparatus 2 further includes a housing 120 at an end of the apparatus 2. The housing 120 includes four electro-magnetic-interference (EMI) fingers 122. In other embodiments, there may be fewer than four EMI fingers 122 (e.g., one EMI finger 122), or more than four EMI fingers 122. During use when multiple apparatuses 2 are installed in a side-by-side configuration, the EMI fingers 122 at an apparatus 2 touch the base of the adjacent apparatus 2, thereby dividing the gap between the two adjacent apparatuses 2. For example, in some embodiments, for a gap that is 2.8 inches long between two adjacent apparatuses 2, the four EMI fingers 122 may divide up the 2.8 inches long gap into sections of approximately 0.6 inch long smaller gaps. This may effectively contain (e.g., reduce) the EMI within the system, and may prevent other devices nearby this system to be affected by the interference.

Figure 6:
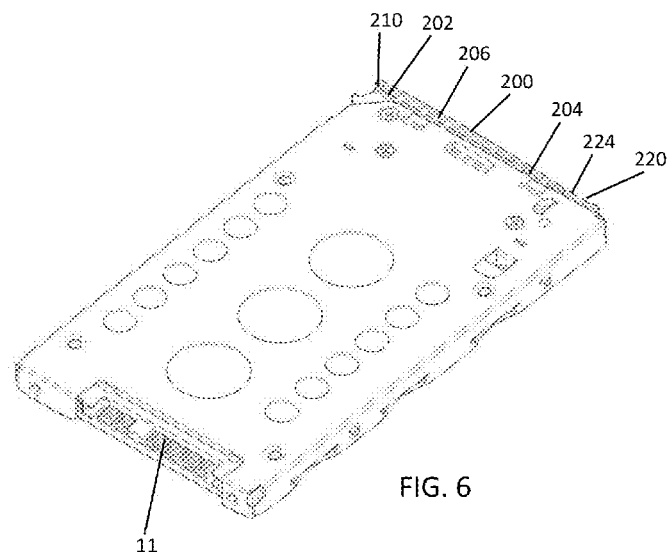
FIG. 6 illustrates the apparatus of FIG. 1 in accordance with some embodiments.
Figure 8A:
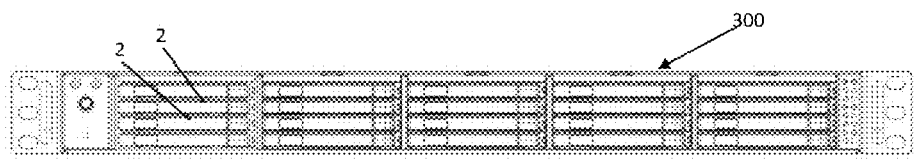
Figure 8B:
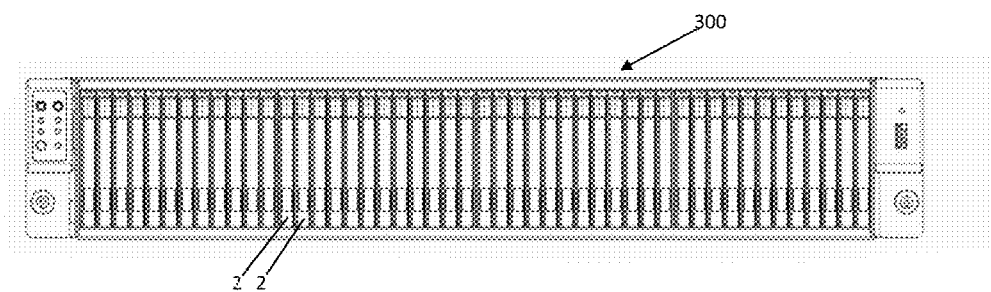
Figure 8J:
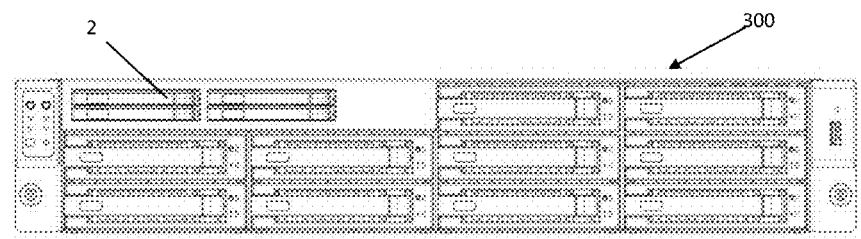

As shown in FIGS. 1, 6, and 7, the apparatus 2 also includes a connector 200 that is rotatably secured to one end of the apparatus 2. The connector 200 is configured to detachably couple the apparatus 2 to a frame 300 (e.g., a chassis, structure, etc., that is configured to house multiple drive storage devices). The connector 200 includes a first end 202 that is rotatably secured to the apparatus 2, a second end 204, and a body 206 extending from the first end 202 to the second end 204. The apparatus 2 further includes a protrusion 210 at the first end 202 configured for insertion into an opening at a frame for anchoring the apparatus 2 against the frame. As shown in FIG. 6, the apparatus 2 also includes a button 220 that is actuatable by sliding the button 220 in the direction 222 shown, which in turn, moves a latch 224 also in the direction 222. The second end 204 of the connector 200 includes an engagement portion 226 for engaging against the latch 224 at the button 220. During use, the button 220 may be actuated by sliding the button 220 in the direction 222, thereby releasing the engagement portion 206 of the connector 200 from the latch 224 (top diagram in FIG. 6). The connector 200 may be swung open to a first position (an open position) to allow insertion of the apparatus 2 into a slot 302 at the frame 300, and may be closed to a second position (a closed position) to lock the apparatus 2 against the frame. To close the connector 200, the connector 200 may be rotated until a ramp portion 228 at the second end 204 of the connector 200 is engaged with the latch 224. The connector 200 may then be pressed further, to cause the ramp portion 228 to lift the button 220 until the end of the ramp portion 228 passes the latch 224. After the end of the ramp portion 228 passes the latch 224, the button 220 will automatically move back to its original position (due to a spring (not shown)) in which the engagement portion 226 is locked against the latch 224.

In some embodiments, the apparatus 2 may have a thickness (excluding the dimension due to the EMI fingers 122) that is less than 10 mm or less, and more preferably 9 mm or less, and even more preferably 8 mm or less (e.g., 7.8 mm).

During use of the apparatus 2, the clam 60 is positioned to the first position to open the clam 60 relative to the container 20, and the drive 10 is placed into the container 20 (FIG. 3). After the drive 10 is placed into the container 20, the longitudinal sides of the drive 10 are engaged (e.g., frictionally engaged) by the protrusions 50 at the two walls 42, 46 of the container 20, and the short side at one end of the drive 10 is engaged by the end walls 32, 34 of the container.

After the drive 10 is desirably positioned in the container 20, the clam 60 is then rotated from the first position to the second position to close the clam 60 relative to the container 20 (FIG. 4). When the clam 60 is at the second position, the tabs 90, 92 of the clam 60 engage with a major surface of the drive 10. Also, the tabs 94, 96 at the container engage with the major planar surface of the drive 10. Thus, the tabs 90, 92, 94, 96 collectively secure the drive 10 relative to the container 20 so that the drive 10 is prevented from falling off from the container 20.

As illustrated in the above embodiments, the apparatus 2 is advantageous because it allows the drive 10 to be detachably secured to the apparatus 2 without using any screw. Thus, the apparatus 2 saves time in installing the drive 10, and does not require use of a tool (e.g., a screw driver) to secure the drive 10 to the drive storage device. To appreciate how significant this advantage is, consider for example, using four screws to secure a drive using conventional technique, which may take one minute to install each drive at the fastest rate. On the other hand, using the tool-less feature described herein, installing a drive to a tray may take at most 5-seconds, resulting in a saving of 55 seconds per device. Accordingly, installing 48 drives may save 44 minutes of labor. Also, unlike the screws, which may get lost, the clam 60 will not get lost because is always coupled to the apparatus 2. Furthermore, because use of the apparatus 2 does not require any screw driver (which may damage the screws and/or the drive 10 due to stripping of the screw heads and/or over-turning of the screws), the apparatus 2 is relatively more durable.

In one or more embodiments, the apparatus (tray) 2 is configured (e.g., shaped, sized, etc.) for accommodating a 2.5"×7 mm thick solid state device drive so that the density (e.g., packing density of multiple drives) is optimized. Existing 2.5" hard disk drive trays are designed for thicker hard disk drives at 15 mm thick, so that when such trays are used for thinner 7 mm thick solid state device drives, the space usage is not optimized. Embodiments described herein may allow twice as many trays to fit in a same given space when comparing to using 2.5" hard disk drive tray for the 7 mm thick solid state device drives.

Figure 7A:
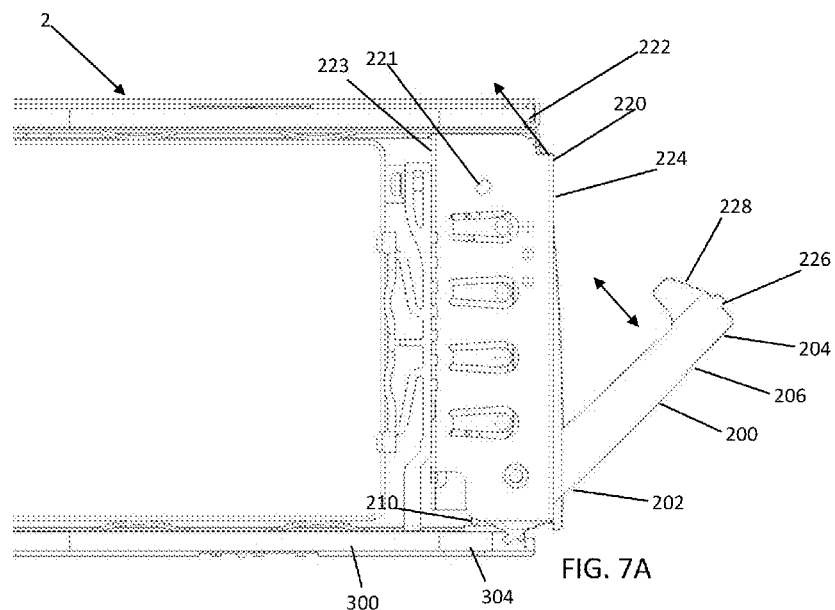
FIGS. 7A-7C illustrate a mechanism for detachably securing the apparatus of FIG. 1 to a frame in accordance with some embodiments.
Figure 7B:
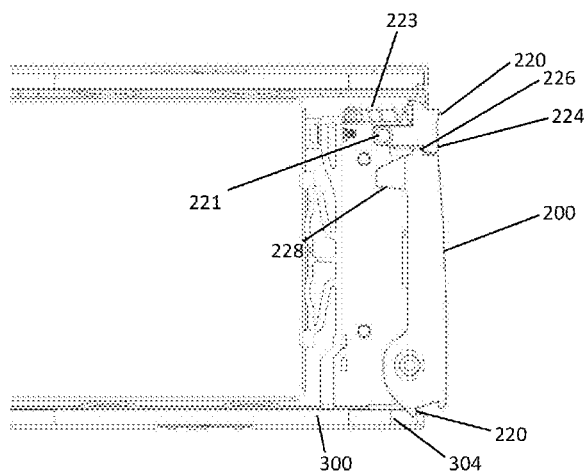
Figure 7C:
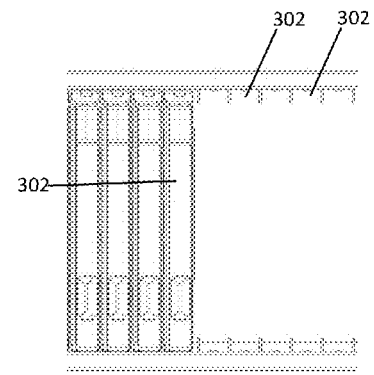
Figure 7D:
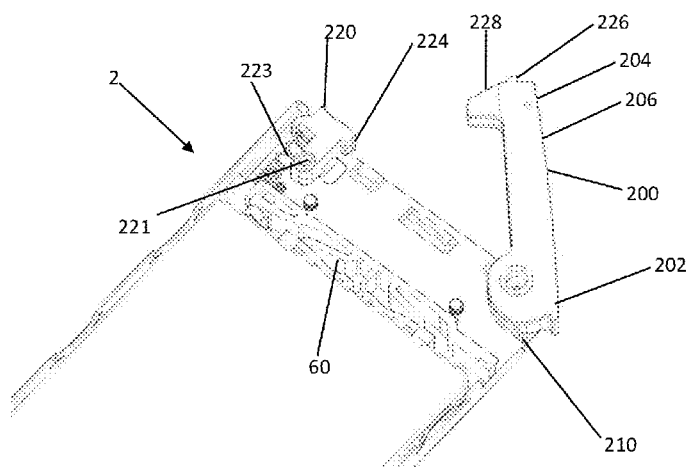
FIG. 7D illustrates internal features of the mechanism of FIG. 7A in accordance with some embodiments.

As discussed, the apparatus 2 is configured to receive and detachably secure the drive 10 relative to its container 20, and detachably secure itself (together with the drive 10) to a frame 300. As shown in FIGS. 7A-7C, after the device 10 is received in the container 20 of the apparatus 2, the apparatus 2 may be detachably couple to a frame 300. The frame 300 may be a chassis, a server frame, a structure, or any component that is capable of storing multiple solid state drives or hard disk drives. In the illustrated embodiments, the button 220 may be pressed to release the connector 200 from a locked position, and the connector 200 of the apparatus 2 is rotated so that the protrusion 210 at the connector 200 is out of the way of the insertion path of the apparatus 2 (FIG. 7A). In some embodiments, the button 220 may be rotatably coupled to a hinge 221, and may be biased using a spring 223 (FIG. 7D). In the illustrated embodiments, the connector 200 is spring rotated to an open position (and may optionally be opened further manually). In other embodiments, the connector 200 may be manually rotated to an open position. The apparatus 2 is then inserted into a slot 302 of a frame 300 (FIG. 7C). In particular, the apparatus 2 is inserted into the slot 302 of the frame 300 until the contacts 11 at the drive 10 exposed at the opening 21 at an end of the apparatus 2 are electrically and mechanically engaged with respective contacts in a connector at the frame 300. In some embodiments the connector at the frame 300 may be coupled to a printed circuit board (PCB). After the apparatus 2 is fully inserted into the slot 302 of the frame 300, the connector 200 is then rotated to a closed position to lock the apparatus 2 against the frame 300 (FIG. 7B). When the connector 200 is at the closed position, the protrusion 210 is rotated into an opening 304 at the frame 300 thereby allowing the protrusion 210 to anchor against the frame 300.

In some embodiments, additional apparatus(es) 2 may be inserted into other slot(s) 302 at the frame 300 after the first apparatus 2 has been secured to the frame 300. For example, a second apparatus 2 may be used to store another drive 10, and may be inserted into another slot 302 at the frame 300. For example, the second apparatus 2 may be inserted into a slot 302 that is next to the first apparatus 2. In some embodiments, the two adjacent apparatuses 2 may be stacked directly next to each other (e.g., with no spacing, or with a slight gap, therebetween the major surface of the drive 10 at one apparatus 2 and the major surface of the base 30 of the adjacent apparatus 2) so that one side of an apparatus 2 may be used to prevent the clam 60 at the other apparatus 2 from being opened. In some embodiments, the center-to-center spacing between adjacent slots 302 may be a value that is anywhere from 7.6 mm to 8.8 mm, and more preferably, 7.6 mm. In other embodiments, the spacing may be less than 7.6 mm or more than 8.8 mm.

The frame 300 may have different configurations in different embodiments. FIGS. 8A-8J illustrates different frames 300 for receiving multiple drive storage devices in accordance with different embodiments. Each frame 300 has a plurality of slots configured (e.g., sized, shaped, and/or positioned) for receiving respective drive storage devices. In the illustrated embodiments, each drive storage device may be the apparatus 2 of FIG. 1.

Also, in the illustrated embodiments, after two adjacent apparatuses 2 have been inserted into the slots in the frame 300, the EMI fingers of the apparatus 2 may touch the base 30 of the adjacent apparatus 2.

In some embodiments, the frame 300 may include at least sixteen slots configured to receive respective drive storage devices 2, which store respective 7 mm thick drives (e.g., SFF8201 7 mm thick drives) in EIA RS310D 1U space. In some embodiments, the frame 300 may include twenty slots for receiving twenty devices 2. In some embodiments, a rack-mount unit "U" may be defined as 19" wide by 1.75" height of area, and within this area there is a maximum number of standard form factor devices that can be fitted. This is referred to as density. In a 1U space using normal 2.5"×15 mm thick hard disk drive trays, one may fit a maximum of twelve devices. However, using embodiments of the apparatus (tray) 2 described herein, for the 7 mm thick solid state device drive, one may fit twenty devices in the same given space constraint. This will result in greater storage capacity (due to higher density—number of units) and better performance (due to aggregation of twenty devices instead of twelve devices).

In other embodiments, the frame 300 may include at least forty-eight slots configured to receive respective drive storage devices 2, which store respective 7 mm thick drives (e.g., SFF8201 7 mm thick drives), in EIA RS310D 2U space. "2U" refers to two times the rack-mount units, which is 3.5" height by 19" wide, so typically in a 2U space, one may fit up to thirty device trays if tray is designed for 15 mm thick hard disk drives. However, using embodiments of the apparatus (tray) 2 described herein, for the 7 mm thick solid state device drive, one may fit forty-eight devices 2 in the same given space constraint. This will result in greater storage capacity (due to higher density—number of units) and better performance (due to aggregation of twenty devices instead of twelve devices).

Figure 9:
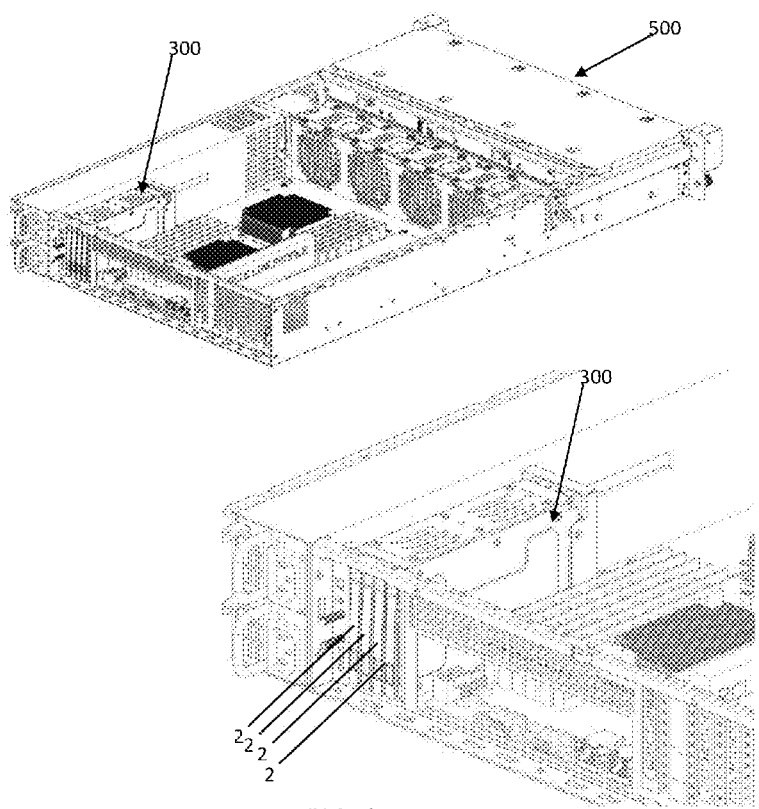
FIG. 9 illustrates a computer system in accordance with some embodiments.

In other embodiments, the frame 300 may be a component in a computer system. FIG. 9 illustrates a computer system 500 that includes a frame 300 in accordance with some embodiments. In the illustrated embodiments, the frame 300 is in a form of a canister-like apparatus. The frame 300 includes a plurality of slots configured to receive respective drive storage devices, wherein each of the storage devices may be the apparatus 2 of FIG. 1.

It should be noted that the apparatus 2 is not limited to accommodate drive that is 7 mm thick, and may be configured (e.g., sized and/or shaped) to accommodate thinner or thicker drive. For example, in other embodiments, if a drive can be designed to be less than 7 mm thick (e.g., 5 mm thick), the apparatus 2 may be sized accordingly to maximize a number of apparatuses 2 that can fit within a frame. Thus, the number of apparatuses 2 that can fit within a frame 300 is not limited to the examples described herein, and may be more.

Although particular embodiments have been shown and described, it will be understood that they are not intended to limit the claimed inventions, and it will be obvious to those skilled in the art that various changes and modifications may be made. The specification and drawings are, accordingly, to be regarded in an illustrative rather than restrictive sense. The claimed inventions are intended to cover alternatives, modifications, and equivalents.

What is claimed:

1. An apparatus for storing a drive, comprising:
   a container having a base for receiving the drive, the base having a long side and a short side, the base being parallel with a major surface of the drive; and
   a member having a first end that is rotatably coupled to the base, a second end, and a body extending from the first end to the second end, a major portion of the member having a longitudinal extension that is perpendicular to the long side of the base of the container, the member rotatable relative to the base so that the member can be placed at a first position and a second position;
   wherein when the member is at the first position, the container allows the drive to be placed therein;
   wherein when the member is at the second position, the member presses against an exterior surface of the drive to secure the drive relative to the container; and
   wherein the second end of the member is a free end, and wherein the member is configured to move within a plane that is perpendicular to the base.

2. The apparatus of claim 1, wherein the member comprises a first tab for engaging the drive when the member is at the second position.

3. The apparatus of claim 2, wherein the member comprises a second tab for engaging the drive when the member is at the second position.

4. The apparatus of claim 2, wherein the first tab has a surface that is parallel to the base when the member is at the second position.

5. The apparatus of claim 1, wherein the member comprises a spring component for applying a force to a side of the drive when the member is placed at the second position to secure the drive relative to the container.

6. The apparatus of claim 5, wherein the spring component comprises one or more cantilever elements.

7. The apparatus of claim 6, wherein the one or more cantilever elements are coupled to the body of the member, and form a unity configuration with the body of the member.

8. The apparatus of claim 1, wherein the member is rotatable about an axis that is parallel to the long side of the base.

9. The apparatus of claim 1, wherein the member is configured to detachably couple the drive to the container without using a screw.

10. The apparatus of claim 1, wherein the member is rotatably connected to a wall that is formed from a portion of the base by bending the portion out of a plane of the base.

11. The apparatus of claim 1, wherein the container further comprises a first wall along a first side of the base, and a second wall along a second side of the base, the second side of the base being the long side of the base, wherein the first wall comprises a curvilinear portion for engagement with a side of the drive when the drive is received by the container.

12. The apparatus of claim 1, wherein the container further comprises an end wall, and a first wall flange extending from the wall, the first wall flange having a surface that is parallel to the base.

13. The apparatus of claim 12, wherein the container further comprises a second wall flange extending from the wall.

14. The apparatus of claim 1, further comprising a connector rotatably coupled to one end of the base for detachably securing the apparatus to a frame.

15. The apparatus of claim 14, wherein the connector includes a protrusion for insertion into an opening at the frame.

16. The apparatus of claim 1, wherein the drive comprises a solid state drive.

17. The apparatus of claim 1, wherein the drive comprises a hard disk drive.

18. The apparatus of claim 1, wherein the container is configured to receive a 7 mm drive.

19. A frame, comprising:
   a plurality of slots configured to receive respective drive storage devices;

wherein one of the drive storage devices being the apparatus of claim 1.

20. The frame of claim 19, wherein the plurality of slots comprises at least sixteen slots configured to receive the respective drive storage devices, which store respective SFF8201 7 mm drives, in EIA RS310D 1U space.

21. The frame of claim 19, wherein the plurality of slots comprises at least forty-eight slots configured to receive the respective drive storage devices, which store respective SFF8201 7 mm drives, in EIA RS310D 2U space.

22. A computer system having the frame of claim 19.

23. A frame, comprising:
   a plurality of slots configured to receive respective drive storage devices, at least one of the drive storage devices configured to removably contain a drive;
   wherein a center-to-center spacing between two adjacent ones of the plurality of slots is 8.8 mm or less; and
   wherein the frame further comprises a horizontal surface having a plurality of openings, at least one of the openings at the horizontal surface is sized for accommodating a protrusion at a rotatable member of one of the drive storage devices.

24. The frame of claim 23, wherein the plurality of slots comprises at least sixteen slots configured to receive the respective drive storage devices, which store respective SFF8201 7 mm drives, in EIA RS310D 1U space.

25. The frame of claim 23, wherein the plurality of slots comprises at least forty-eight slots configured to receive the respective drive storage devices, which store respective SFF8201 7 mm drives, in EIA RS310D 2U space.

26. The frame of claim 23, wherein one of the drive storage devices comprises
   a container having a base for receiving the drive, the base having a long side and a short side; and
   a member having a first end that is rotatably coupled to the base, a second end, and a body extending from the first end to the second end, the body of the member having a longitudinal extension that is perpendicular to the long side of the base of the container, the member rotatable relative to the base so that the member can be placed at a first position and a second position;
   wherein when the member is at the first position, the container allows the drive to be placed therein; and
   wherein when the member is at the second position, the member presses against an exterior surface of the drive to secure the drive relative to the container.

27. A computer system having the frame of claim 23.

28. A frame, comprising:
   at least sixteen slots configured to receive respective drive storage devices, which are configured to removably store respective SFF8201 7 mm drives, in EIA RS310D 1U space, wherein one of the drive storage devices comprises a container for containing one of the drives, and a rotatable member for pressing against a side surface of the one of the drives to secure the one of the drives relative to the container;
   wherein the container has a base with a long side and a short side, and wherein the rotatable member has a major portion with a longitudinal extension that is perpendicular to the long side of the base of the container; and
   wherein the member has a free end, and wherein the member is configured to move within a plane that is perpendicular to the base.

29. A frame, comprising:
   at least forty-eight slots configured to receive respective drive storage devices, which are configured to removably store respective SFF8201 7 mm drives, in EIA RS310D 2U space, wherein one of the drive storage devices comprises a container for containing one of the drives, and a rotatable member for pressing against a side surface of the one of the drives to secure the one of the drives relative to the container;
   wherein the container has a base with a long side and a short side, and wherein the rotatable member has a major portion with a longitudinal extension that is perpendicular to the long side of the base of the container; and
   wherein the member has a free end, and wherein the member is configured to move within a plane that is perpendicular to the base.

* * * * *